Aug. 22, 1961    A. H. MILLER    2,996,879
GRAIN IMMOBILIZER
Filed July 13, 1954    2 Sheets-Sheet 1

INVENTOR
ARTHUR H. MILLER

BY
ATTORNEYS

United States Patent Office 2,996,879
Patented Aug. 22, 1961

2,996,879
GRAIN IMMOBILIZER
Arthur H. Miller, Silver Spring, Md., assignor to the United States of America as represented by the Secretary of the Navy
Filed July 13, 1954, Ser. No. 443,185
10 Claims. (Cl. 60—35.6)

This invention relates generally to aerial vehicles; more particularly it relates to an improved shock absorbing apparatus for preventing the sudden shifting of propellent grains in a sustainer rocket casing of a rocket powered missile, while at the same time permitting gradual thermal expansion or contraction of said grains.

The invention of this application is an improvement on that shown in the patent to Grimes et al., No. 2,703,478, issued March 8, 1955, for Rocket Grain Shock Absorbing Apparatus.

Propellent materials for rockets possess high heat expansion coefficients compared with those of the metals used in the sustainer rocket casings. As a consequence, differential thermal expansion or contraction occurs, whereby the propellent grains expand against the end walls of the casings or shrink within the limits thereof. In either case, a highly undesirable situation arises. Expansion against the end walls of the casings produce compressive stresses within the grains and if great enough result in the rupturing of said grains. Contraction permits the shifting of the grains and when the missiles undergo severe decelerations or accelerations during flight, violent collisions occur between said grains and the end walls. As a result, the grains sometimes rupture or split and serious damage is done to the missiles or to equipment carried thereby.

The use of coil springs or other spring shock absorbing means alone is prohibited by the low compressive strength of the grains. Springs strong enough to oppose the forces arising during deceleration will rupture or at least deform the grains.

Accordingly, it is the primary object of the present invention to provide an improved shock absorber of the type using silicone fluid for preventing shifting of propellent grains in a sustainer rocket casing while at the same time allowing and compensating for changes in grain length caused by temperature variations.

It is a specific object of the invention to provide shock absorbing apparatus using silicone fluid in a shock absorber cylinder that is satisfactorily sealed to prevent leakage of said fluid.

Other objects and many of the attendant advantages of this invention will be readily appreciated as the same becomes better understood by reference to the following detailed description when considered in connection with the accompanying drawings, wherein.

Briefly, the present invention contemplates the provision of shock absorbing apparatus at the forward end of the sustainer rocket of a missile, interposed between the missile bulkhead and the propellent grains. The shock absorbing apparatus includes a pressure plate which abuts the forward ends of the rocket grains. The pressure plate is mounted for restricted sliding motion against the action of a compression spring by means of a piston and cylinder arrangement, the cylinder being filled with silicone damping fluid.

Figure 1:
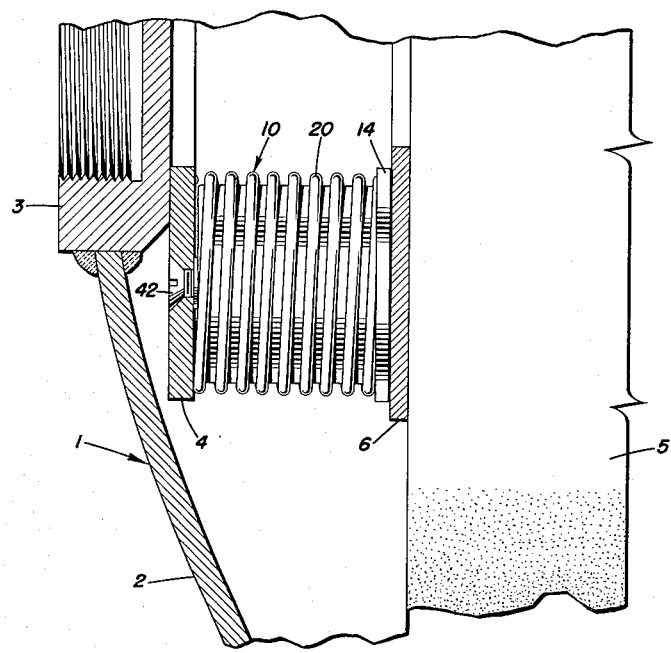
FIG. 1 is a fragmentary section of the forward end of a sustainer rocket casing and showing, in elevation, the improved shock absorber mounted in operative position.
Figure 2:
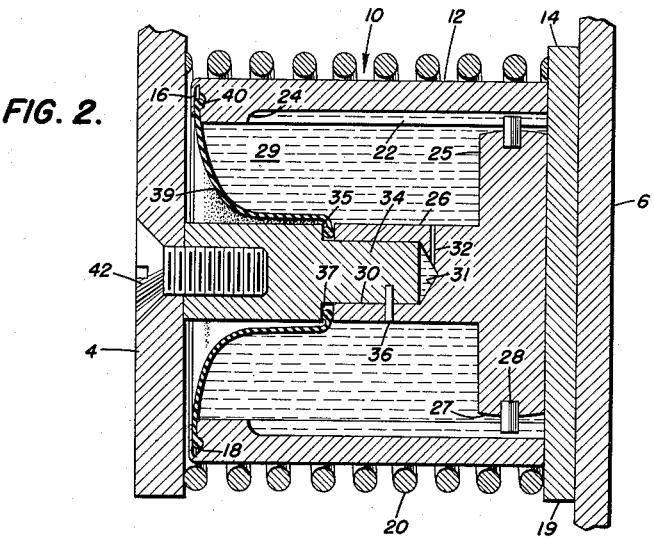
FIG. 2 is an enlarged section showing the invention in contracted position.
Figure 3:
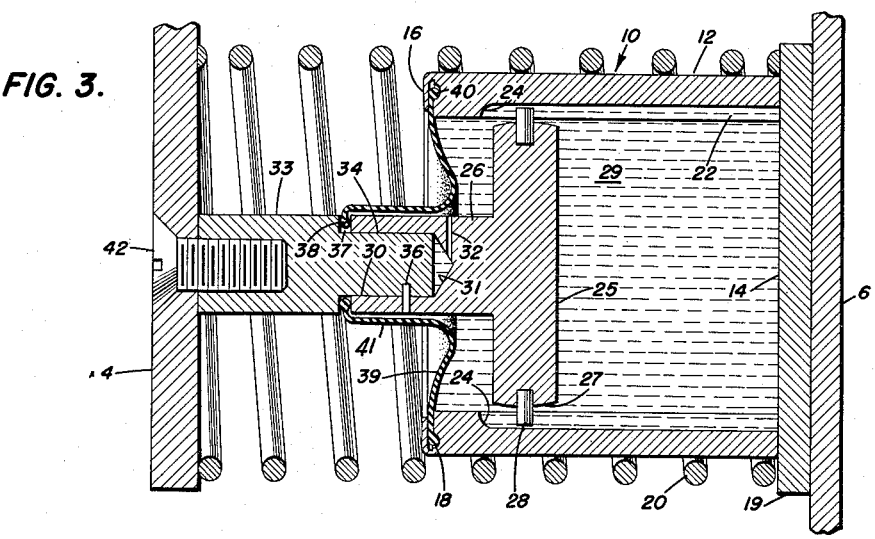
FIG. 3 is a view similar to FIG. 2, but showing the device in expanded position.

Referring to the drawings in detail, and particularly to FIGS. 1, 2 and 3 thereof, the numeral 1 indicates generally a sustainer rocket casing, only a portion of the forward end of which is shown. The rocket casing 1 is closed at its forward end by a wall 2 which carries an axially mounted apertured cap 3 for receiving an igniter (not shown). Mounted in the casing 1 adjacent the cap 3 is an annular base or supporting plate 4. A rocket propellent grain is shown fragmentarily at 5, and bearing against the forward end of the grain is an annular pressure plate 6.

As in application Serial No. 362,484, now Patent No. 2,703,478, a plurality of shock absorbers are arranged in an annular series in the rocket casing 1, to provide uniform pressure on the rocket grain or grains in said casing. Since these shock absorbers are of identical construction, only one has been shown and described in this application, and it is indicated generally by the numeral 10.

The shock absorber 10 includes a cylinder 12 closed at its inner end by a circular end wall 14 which bears against pressure plate 6. The side wall of the cylinder terminates at its outer end in a relatively thin, inturned clamping rim 16, and the end face of said side wall is formed with an annular groove 18. As will be seen, the end wall 14 is of greater diameter than the cylinder 12, thus defining a seat 19 against which bears one end coil of a helical spring 20. The spring 20 fits loosely about the cylinder, and is guided thereby, for a purpose to be explained hereinafter.

Diametrically opposed guide grooves 22 are formed on the inner surface of the side wall of the cylinder 12 and extend from the closed end of the cylinder to points near but spaced from the opposite end thereof, to define stop shoulders 24.

Mounted in the cylinder 12 is a piston 25 having a piston rod with an integral inner rod element 26. The piston 25 fits loosely in the cylinder and has an arcuate rim 27 with guide tongues 28 projecting therefrom and engageable in the grooves 22. As best seen in FIGS. 2 and 3, the arcuate rim of the piston is spaced from the inner surface of the side wall of the cylinder an amount sufficient to permit the passage, at a slow rate, of fluid 29 in the cylinder. The fluid 29 is preferably one of the well-known silicone compounds.

The integral inner piston rod element 26 is counterbored to define a recess 30, said recess being formed with a conical inner end wall 31 and having a bleeder port 32 communicating with the interior of the cylinder. The piston rod element 26 cooperates with an outer piston rod element 33 which has a reduced end portion 34 defining a shoulder 35 and fitting into the recess 30, said elements 26 and 33 being held in operative relationship by a pin 36 which extends through the wall of the element 26 and into said reduced end portion 34. The bleeder port 32 permits escape of any fluid in the recess 30, thus permitting full insertion of the portion 34 into said recess.

The reduced portion 34 of the outer piston rod element 33 is of slightly greater length than the depth dimension of the recess 30, with the result that the shoulder 35 and the end face of the element 26 cooperate to provide an annular clamping jaw 37. The jaw 37 clamps the beaded inner rim 38 of a reversible diaphragm 39, of rubber or other flexible material. The diaphragm 39 closes the outer end of the cylinder, and has a beaded outer rim 40 held in the groove 18 by the clamping rim 16. Said diaphragm is also provided with a generally tubular central portion 41 which is distortable from the shape shown in FIG. 2, with the piston 25 at its innermost position, to that shown in FIG. 3, wherein said piston is shown near its outermost position.

The piston 25 is rigidly secured to the annular base plate 4 by a screw 42, passing through said plate into a threaded bore in the outer piston element 33, and the spring 20 is confined between said plate 4 and the seat 19 on the plate 14.

In operation, the spring 20, bearing against the seat 19 and the supporting plate 4, maintains a constant pressure on the grain 5. Any gradual changes in length of said grain, brought about as a result of temperature changes, are compensated for by flexing of the spring and movement of the piston 25 in the cylinder 12, which said piston movement is permitted by the flow of fluid 29, at a slow rate, in the cylinder between the inner surface of the wall of said cylinder and the arcuate rim 27 of said piston. In the event of considerable shrinkage of the grain 5 in the casing 1, the piston 25 will be extended to near its maximum point of travel in the cylinder. Should the forces of deceleration act on the rocket, however, sudden shifting of the grain 5 will be prevented by the action of the fluid 29 on the piston. That is, because the flow of the fluid 29 past the piston will be restricted to a slow rate, said piston will be prevented from shifting suddenly in response to outside forces acting on the rocket casing, and sudden shifting of the grain 5, with consequent possible damage thereto or to said rocket casing, will be prevented.

The diaphragm 39, being firmly anchored at its center in the jaw 37 and at its outer margin by the clamping rim 16, will effectively prevent escape of the fluid 29 from the cylinder 12.

Figure 4:
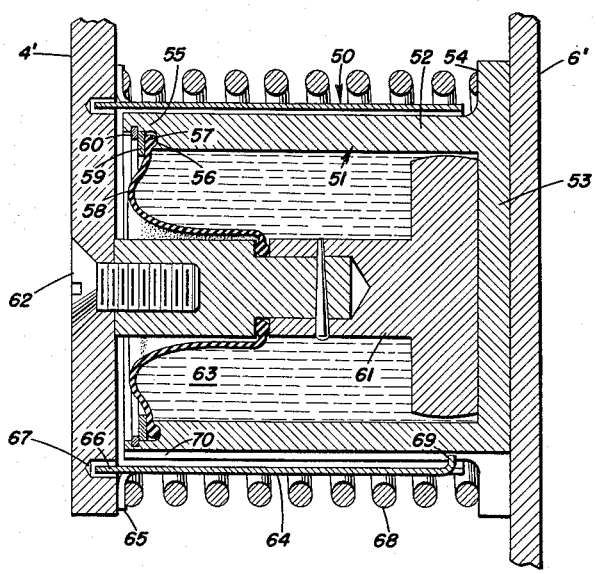
FIG. 4 is a longitudinal section illustrating a modified embodiment of the invention.

The modification of the invention, illustrated in FIG. 4, functions in a manner identical to that of the first-described embodiment but incorporates minor changes in structure, now to be described. In FIG. 4, the mounting plate is shown at 4' and the pressure plate at 6'. The modified shock absorber is shown generally at 50 and includes a cylinder 51 having a side wall 52 and an inner end wall 53, said end wall bearing against the pressure plate 6' and having a flange defining a seat 54. The outer end portion of the side wall 52 is reduced, as shown at 55, to define an annular shoulder adjacent the inner surface of said wall, and said shoulder is grooved to form a seat 56 to receive a bead 57 on the outer rim of a diaphragm 58, identical to the diaphragm 39, which closes the outer end of the cylinder 51. The bead 57 is held in the seat 56 by a retaining ring 59 which is, in turn, held in place by a locking ring 60 which engages in a suitable groove in the reduced portion 55.

The diaphragm 58 has its central portion secured to a piston-piston rod assembly 61 in a manner similar to that of the first-described embodiment, the piston rod having its outer end fastened to the supporting plate 4' by a screw 62. Fluid 63 is carried in the cylinder 51.

The essence of the modification of FIG. 4 resides in the provision of a relatively thin walled sleeve 64 which surrounds the cylinder 51 in close spaced relation thereto. The sleeve 64 is formed with a base flange 65 which bears against the supporting plate 4'. Fingers 66, struck from the flange 65, engage in recesses 67 for preventing rotation of the sleeve about the cylinder. A spring 68, identical to the spring 20, surrounds the sleeve and has opposite end coils engaging the seat 54 and the flange 65. To prevent rotation of the cylinder 51 with respect to the sleeve 64 a tongue 69 is struck inwardly from the inner end of said sleeve and engages in a groove 70 which extends longitudinally of the cylinder throughout its length.

In the modification of FIG. 4 the sleeve 64 functions to prevent any of the convolutions of the spring 68 from engaging the cylinder 51 and possibly limiting the effectiveness of said spring. The sleeve further functions to prevent relative rotation of the cylinder and the piston.

Obviously many modifications and variations of the present invention are possible in the light of the above teachings. It is therefore to be understood that within the scope of the appended claims the invention may be practiced otherwise than as specifically described.

What is claimed is:

1. The combination with a rocket casing having an end wall, a rocket grain in the casing and spaced from the end wall, a pressure plate engaging the grain, and a supporting plate on the end wall, of means for preventing sudden shifting of the propellent grain, comprising a shock absorber having a cylinder on the pressure plate, a piston mounted loosely in the cylinder and having a rod engaging the supporting plate, damping fluid in the cylinder, means shifting the piston in the cylinder, and flexible means closing the outer end of the cylinder, said fluid acting on the piston to prevent sudden shifting thereof but flowing about said piston upon gradual movement thereof.

2. In combination, a rocket casing having a propellent grain therein, and a shock absorber for retarding movement of said rocket propellent grain in said rocket casing including a cylinder closed at one end and open at its other and having a wall formed at said open end with a clamping rim and an annular groove, a piston in the cylinder and having a piston rod comprising inner and outer rod elements cooperating to define a jaw, damping fluid in the cylinder for retarding movement of the piston, and a flexible diaphragm closing the open end of the cylinder, said diaphragm having a beaded rim engaging in the groove and clamped by said rim, and an axial aperture with a beaded margin anchored in said jaw.

3. The combination with a rocket casing closed at its forward end, and a propellent grain in the casing, of means for limiting movement of the grain in the casing, comprising a cylinder having one end confronting the grain and the other end facing the closed forward end of the casing, said other end being a flexible diaphragm, and means carried by the cylinder and cooperating therewith and with the casing and the grain for preventing sudden shifting of said grain, said last mentioned means including a piston in the cylinder, a spring surrounding the cylinder and coupled with the piston, and a sleeve between the spring and the cylinder.

4. A shock absorber including, in combination with a rocket casing having an end wall, a supporting plate on the end wall, a propellent grain in the casing and a pressure plate bearing against the grain; a cylinder having an inner end wall engaging the pressure plate, a piston in the cylinder and having a rim spaced from the side wall of the cylinder, fluid in the cylinder and displaceable between the rim and the side wall upon gradual movement of the piston, a flexible diaphragm closing the cylinder at its outer end, said piston having a rod connected to the supporting plate, a spring surrounding the cylinder and bearing against the supporting plate and the end wall of the cylinder, said spring urging the piston outwardly in the cylinder under control of the fluid for maintaining pressure on the grain, said fluid acting on the piston to prevent movement of said grain in response to a sudden shock applied to the casing, and a sleeve between the cylinder and the spring.

5. In combination with a rocket casing, a propellent grain therein, a supporting plate in the casing, and a pressure plate bearing against the propellent grain; means for preventing sudden displacement of the propellent grain in the casing but allowing gradual movement of said grain, comprising a shock absorber having a cylinder with its inner end wall on the pressure plate, a piston loosely mounted in the cylinder, mating tongue and groove structure on the piston and in the cylinder for preventing rotation of the piston in the cylinder, damping fluid in the cylinder, a piston rod on the piston and connected to the supporting plate, a flexible diaphragm closing one end of the cylinder and having a central portion connected to the piston rod, and a spring surrounding the cylinder and bearing against the supporting plate and the inner end wall of the cylinder for urging the piston outwardly in the cylinder, whereby the piston rod and cylinder will be maintained in engagement with the plates.

6. In a rocket casing for a missile, and a propellent grain in the casing, a shock absorber for limiting movement of the grain in the casing, including a cylinder connected with the grain, a piston in the cylinder and connected with the casing, damping fluid in the cylinder, said piston being loosely mounted in the cylinder and being movable under control of the damping fluid, a flexible diaphragm closing one end of the cylinder, a spring surrounding the cylinder and cooperating with the casing, the grain and the piston for limiting movement of said grain in the casing, a sleeve between the cylinder and the spring, and means on the sleeve and engageable with the cylinder for preventing rotation of said sleeve with respect to said cylinder.

7. A shock absorber as recited in claim 6, wherein said means is constituted by a tongue on the sleeve, and a groove in the cylinder slidably receiving the tongue.

8. In combination with a rocket casing having an end wall, a rocket grain in the casing and spaced from the end wall, a pressure plate engaging the grain, and a supporting plate on the end wall; means for preventing sudden shifting of the propellent grain, comprising a shock absorber having a cylinder on the pressure plate, a piston movably mounted in the cylinder and having a rod engaging the supporting plate, damping fluid in the cylinder, means shifting the piston in the cylinder, flexible means closing the end of the cylinder remote from the pressure plate, and means cooperating with the piston and cylinder for bypassing damping fluid in said cylinder during movement of the piston, said fluid acting on the piston to prevent sudden shifting of said propellent grain.

9. The combination recited in claim 8, wherein said second mentioned means includes a circular end wall for the cylinder, and a spring surrounding the cylinder and confined between the end wall and the supporting plate.

10. The combination with a rocket casing for a missile, and a propellent grain in the casing of a shock absorber for limiting movement of the grain in the casing, said shock absorber comprising a cylinder having a groove along its inner wall, a piston movable in the cylinder and having a rim spaced from said inner wall to define a fluid passage, a spring surrounding the cylinder and urging the piston to move outwardly in said cylinder, and fluid in the cylinder and movable through said passage upon movement of the piston.

References Cited in the file of this patent

UNITED STATES PATENTS

| | | |
|---|---|---|
| 483,126 | Bates | Sept. 27, 1892 |
| 491,794 | Barker | Feb. 14, 1893 |
| 1,304,311 | Heldrich | May 20, 1919 |
| 1,304,333 | Loftsgaarden | May 20, 1919 |
| 1,434,197 | Brown | Oct. 31, 1922 |
| 2,432,554 | Knoedler | Dec. 16, 1947 |